United States Patent
Araki et al.

(10) Patent No.: US 10,328,652 B2
(45) Date of Patent: Jun. 25, 2019

(54) STRIP-WINDING METHOD AND STRIP-WINDING APPARATUS

(71) Applicant: BRIDGESTONE CORPORATION, Tokyo (JP)

(72) Inventors: Yuusuke Araki, Tokyo (JP); Masamu Ishizuki, Tokyo (JP); Daisuke Yokoyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 233 days.

(21) Appl. No.: 15/100,859

(22) PCT Filed: Nov. 4, 2014

(86) PCT No.: PCT/JP2014/079184
§ 371 (c)(1),
(2) Date: Jun. 1, 2016

(87) PCT Pub. No.: WO2015/098289
PCT Pub. Date: Jul. 2, 2015

(65) Prior Publication Data
US 2016/0368232 A1  Dec. 22, 2016

(30) Foreign Application Priority Data

Dec. 24, 2013 (JP) ................. 2013-265878

(51) Int. Cl.
*B29D 30/30* (2006.01)
*B29D 30/16* (2006.01)
(Continued)

(52) U.S. Cl.
CPC ......... *B29D 30/3028* (2013.01); *B29D 30/14* (2013.01); *B29D 30/16* (2013.01);
(Continued)

(58) Field of Classification Search
CPC ............ B29D 30/1628; B29D 30/1635; B29D 30/242; B29D 30/3028; B29D 30/3035; B29D 30/70; B29D 2030/3078
See application file for complete search history.

(56) References Cited

U.S. PATENT DOCUMENTS 3,761,341 A * 9/1973 Kimble ................. B29D 30/70
156/446
4,822,444 A    4/1989 Weingart et al.
(Continued)

FOREIGN PATENT DOCUMENTS

JP    H05-131565 A    5/1993
JP    H06-297914 A    10/1994
(Continued)

*Primary Examiner* — Geoffrey L Knable
(74) *Attorney, Agent, or Firm* — Oliff PLC

(57) ABSTRACT

The strip-winding method, includes: a first step of supplying a strip to a wound body including an inclined part; and a second step of moving a winding roller along an outer circumferential surface of the wound body within one plane, the winding roller being capable of pressing the strip on the wound body, and of winding the strip on the outer circumferential surface of the wound body. In the second step, the roller inclination angle of the rotational axis line of the winding roller with respect to the one plane is changed, and the roller inclination angle at the time the strip is wound around the inclined part is set to be greater than the roller inclination angle at the time the strip is wound around a maximum diameter position of the wound body.

10 Claims, 9 Drawing Sheets

(51) Int. Cl.
B29D 30/14 (2006.01)
B29D 30/70 (2006.01)

(52) U.S. Cl.
CPC ..... B29D 30/1628 (2013.01); B29D 30/1635 (2013.01); B29D 30/3035 (2013.01); B29D 30/70 (2013.01); *B29D 2030/3078* (2013.01)

(56) References Cited

U.S. PATENT DOCUMENTS

| | | | |
|---|---|---|---|
| 5,395,475 A | * | 3/1995 | Ozawa ................ B29C 53/8016 156/117 |
| 2005/0077011 A1 | | 4/2005 | Pialot |
| 2006/0081325 A1 | | 4/2006 | Hayashi et al. |

FOREIGN PATENT DOCUMENTS

| | | | |
|---|---|---|---|
| JP | H10-296873 A | | 11/1998 |
| JP | 11-048706 A | * | 2/1999 |
| JP | H11-48706 A | | 2/1999 |
| JP | H11-198247 A | | 7/1999 |
| JP | 2006-110856 A | | 4/2006 |
| JP | 2006-347003 A | | 12/2006 |
| JP | 2007-030300 A | | 2/2007 |
| JP | 2013-022818 A | * | 2/2013 |
| JP | 2013-022818 A | | 2/2013 |
| WO | 03/101713 A1 | | 12/2003 |

* cited by examiner

STRIP-WINDING METHOD AND STRIP-WINDING APPARATUS

TECHNICAL FIELD

The present invention relates to a strip-winding method and a strip-winding apparatus for winding a strip on the outer circumferential surface of a wound body in helical pattern.

Priority is claimed on Japanese Patent Application No. 2013-265878, filed Dec. 24, 2013, the content of which is incorporated herein by reference.

BACKGROUND ART

In the related art, in order to prevent a belt end separation of a pneumatic tire, particularly an aircraft radial tire, and to reduce the weight of the tire, for example, as shown in Patent Document 1 and FIG. 8 thereof, it is proposed to use a belt layer 11 in which a narrow strip 13 is approximately uniformly buried in the entire area of the outer circumferential surface of the tire, and the strip 13 extends approximately in the circumferential direction of the tire while advancing in a zigzag pattern by the strip 13 bending at each of two ends 12a in the width direction of a ply 12.

As a manufacturing apparatus which manufactures such a belt layer (a ply), for example, an apparatus described in Patent Document 2 is proposed. This apparatus includes a supply device which supplies a strip to a wound body rotatable on an axial line; a rotatable winding roller which can press the strip supplied to the wound body on the outer circumferential surface of the wound body; two cylinders which add a turning force to the winding roller and thereby can incline the rotational axis line of the winding roller at a predetermined angle with respect to one plane including the axial line of the wound body; and a movement device which moves the winding roller along the outer circumferential surface of the wound body within the one plane using a guide plate extending along the outer circumferential surface of the wound body as a guide so that the strip is wound a plurality of times by the winding roller on the outer circumferential surface of the wound body in a zigzag pattern while drawing a helical pattern.

DOCUMENT OF RELATED ART

Patent Document

[Patent Document 1] Japanese Unexamined Patent Application, First Publication No. H6-297914
[Patent Document 2] Japanese Unexamined Patent Application, First Publication No. H5-131565

SUMMARY OF INVENTION

Technical Problem

In a strip-winding apparatus in the related art, in a case where the difference in diameter between the center and an outer end in the axial direction of the wound body is a minute value because the outer diameter of the wound body is constant irrespective of a position within the wound body in the axial direction or because the axial direction cross-sectional outline (the outline of the outer circumferential surface in a cross-section of the wound body including the axial line thereof) of the wound body is configured only of an arc having a very large curvature radius, the winding of the strip can be appropriately performed using the winding roller in which the inclination angle of the rotational axis line of the winding roller with respect to one plane, namely the roller inclination angle, is a constant angle. However, in recent years, in order to improve the performance of a tire, a wound body 15 as shown in FIG. 9 has been proposed which includes a constant diameter pad 15a which is positioned in the center in the axial direction of the wound body 15 and has a constant outer diameter, a pair of first inclined parts 15b which are provided on two outer sides in the axial direction of the constant diameter part 15a and in which the axial direction cross-sectional outline of the first inclined part 15b is configured of an arc having a comparatively lane curvature radius and thereby the outer diameter of the first inclined part 15b gradually decreases from the constant diameter part 15a outward in the axial direction; and a pair of second inclined parts 15c which are provided on the outer sides of the first inclined pans 15b in the axial direction and in which the axial direction cross-sectional outline of the second inclined part 15c is configured of an arc having a curvature radius less than that of the first inclined part 15b and thereby the outer diameter of the second inclined part 15c gradually decreases from the first inclined part 15b outward in the axial direction to be less than that of the first inclined part 15b. The decrease rate in diameter of the second inclined pan 15c is greater than that of the first inclined pan 15b.

When a strip 13 is wound around the wound body 15 in helical pattern using, a winding roller 14 in which the inclination angle (the roller inclination angle) G of the rotational axis line A of the winding roller 14 with respect to one plane B including the axial line of the wound body 15 is a constant angle, in the constant diameter part 15a being the maximum diameter position of the wound body 15, the strip 13 is wound while a constant gap is formed between portions next to each other of the strip 13. In contrast, in the first and second inclined parts 15b and 15c, two ends in the width direction of portions next to each other of the strip 13 may overlap each other, and thereby the gap may disappear or significantly decrease. As a result, the quality of a manufactured tire may deteriorate. This is because when the strip 13 is wound on the outer circumferential surface of the wound body 15 in helical pattern using the winding roller 14 in which the roller inclination angle G thereof is a constant angle as described above, while the circumferential direction length L of the strip 13 is approximately constant in any position in the axial direction of the wound body 15, the outer diameter and circumferential length of the first and second inclined parts 15b and 15c gradually decrease from the constant diameter part 15a (the maximum diameter position) toward a distant position therefrom to be less than those of the constant diameter part 15a.

An object of the present invention is to provide a strip-winding method and a strip-winding apparatus by which the value of a gap between portions next to each other of a strip wound around an inclined part can be brought close to the value of a gap at the maximum diameter position, portions next to each other of the strip can be disposed at appropriate positions in the inclined part, and therefore the deterioration of the quality of a tire can be prevented.

Solution to Problem

The present invention adopts the following configurations as means to solve the above problems.

A first aspect of the present invention is a strip-winding method, including: a first step of supplying a strip to a wound body including an inclined part whose diameter gradually decreases toward outside in an axial direction of the wound body, the wound body being rotatable on an axial line; and a second step of moving to rotatable winding roller along an outer circumferential surface of the wound body within one plane including the axial line of the wound body, a rotational axis line of the winding roller being capable of inclining with respect to the one plane and the winding roller being capable of pressing the strip supplied to the wound body on the wound body, and of winding the strip on the outer circumferential surface of the wound body in a helical pattern. In the second step, a roller inclination angle of the rotational axis line of the winding roller with respect to the one plane is changed, and the roller inclination angle at the time the strip is wound around the inclined pan is set to be greater than the roller inclination angle at the time the strip is wound around a maximum diameter position of the wound body.

A second aspect of the present invention is a strip-winding apparatus, including: a supply device which supplies a strip to a wound body including an inclined part whose diameter gradually decreases toward outside in an axial direction of the wound body, the wound body being rotatable on an axial line; a rotatable winding roller in which a rotational axis line thereof is capable of inclining with respect to one plane including the axial line of the wound body, the winding roller being capable of pressing the strip supplied to the wound body on the wound body; and a movement device which moves the winding roller along an outer circumferential surface of the wound body within the one plane so that the strip is wound on the outer circumferential surface of the wound body in a helical pattern. In addition, the strip-winding apparatus further includes: an inclination angle-changing, device which adds a rotational driving force to the winding roller and is capable of changing a roller inclination angle of the rotational axis line of the winding roller with respect to the one plane; and a controller which controls the inclination angle-changing device and is configured to set the roller inclination angle at the time the strip is wound around the inclined part to be greater than the roller inclination angle at the time the strip is wound around a maximum diameter position of the wound body.

A third aspect of the present invention is that in the strip-winding apparatus of the second aspect, the controller is configured to gradually increase the roller inclination angle of the winding roller from the maximum diameter position of the wound body toward a distant position therefrom at the time the strip is wound around the inclined part.

A fourth aspect of the present invention is that in the strip-winding apparatus of the third aspect, the diameter of the wound body at a position on the inclined part is represented by a sign Tx, the number of winding the strip in a state where the strip is wound on the entire circumference of the wound body is represented by a sign n, the width of the strip is represented by a sign w, the gap in a width direction between portions next to each other of the strip wound around the wound body is represented by a sign d, and the controller is configured to set to a value shown by the following Equation (1), the roller inclination angle Gx at the time the strip is wound on the position on the inclined part.

$$Gx = \sin^{-1}\{n \times (w+d)/(\pi \times Tx)\} \quad \text{Equation (1)}$$

A fifth aspect of the present invention is that in the strip-winding apparatus of any one of the second to fourth aspects, the inclination angle-changing device includes: a speed reducer disposed in the middle of a supply path for the strip and provided with a through-hole through which the strip in the middle of supply passes; and a driving mechanism which adds a rotational driving force to the speed reducer. In addition, the winding roller is supported by an output side of the speed reducer.

A sixth aspect of the present invention is that in the strip-winding apparatus of any one of the second to fifth aspects, the movement device includes a detector which detects a circumferential direction distance between portions next to each other of the strip wound around the wound body.

A seventh aspect of the present invention is that in the strip-winding apparatus of any one of the second to sixth aspects, at least a pair of regulation rollers are disposed in the middle of a supply path for the strip, and two sides in a width direction of the strip in the middle of supply are in rolling contact with the regulation rollers.

An eighth aspect of the present invention is that in the strip-winding apparatus of any one of the second to seventh aspects, the movement device includes: a first movement mechanism which moves the winding roller in parallel to the axial line of the wound body within a horizontal plane serving as the one plane; a second movement mechanism which moves the winding roller perpendicularly to the axial line of the wound body within the horizontal plane; and a pivot mechanism which pivots the winding roller around an axial line perpendicular to the horizontal plane.

Effects of Invention

In the first and second aspects of the present invention, when a strip is wound around a wound body provided with an inclined part whose diameter gradually decreases toward outside in the axial direction of the wound body, the roller inclination angle of the rotational axis line of a winding roller with respect to one plane is changed, and the roller inclination angle at the time the strip is wound around the inclined part is set to be greater than the roller inclination angle at the time the strip is wound around a maximum diameter position of the wound body. Therefore, the circumferential direction length of the strip at the inclined part is less than that at the maximum diameter position. In addition, although the circumferential length of the inclined part gradually decreases from the maximum diameter position toward a distant position therefrom as described above, since the circumferential direction length of the strip at the inclined part is less than that at the maximum diameter position as described above, the value of the gap between portions next to each other of the strip wound around the inclined part can be brought close to the value of the gap between portions next to each other of the strip at the maximum diameter position. Thus, portions next to each other of the strip can be disposed at appropriate positions in the inclined part, and therefore the deterioration of the quality of a tire can be prevented.

Although the circumferential length of the inclined part gradually decreases toward outside in the axial direction of the wound body, according to the third aspect of the present invention, the circumferential direction length of the wound strip gradually decreases toward outside in the axial direction of the wound body. Therefore, throughout the entire inclined part, the value of the gap between portions next to each other of the strip at the inclined part can be easily brought close to the value of the gap at the maximum diameter position. According to the fourth aspect of the present invention, the value of the gap between portions next to each other of the strip can be a constant value (be constant) at any position of the wound body. According to the fifth aspect of the present invention, the strip in the middle of supply to the wound body passes through a through-hole of a speed reducer, and does not have to detour around an inclination angle-changing device. Therefore, a supply path for the strip can be formed in a simple shape and can be easily shortened. According to the sixth aspect of the present invention, a detector can always watch the condition of the wound strip, and if an unfavorable condition occurs, it is possible to quickly manage it. According to the seventh aspect, of the present invention, a pair of regulation rollers are provided, and thereby it is possible to supply the strip in a stable attitude to the wound body. According to the eighth aspect of the present invention, the strip can be reliably wound on the outer circumferential surface of the wound body in a helical pattern using a simple structure.

DESCRIPTION OF EMBODIMENTS

Figure 1:
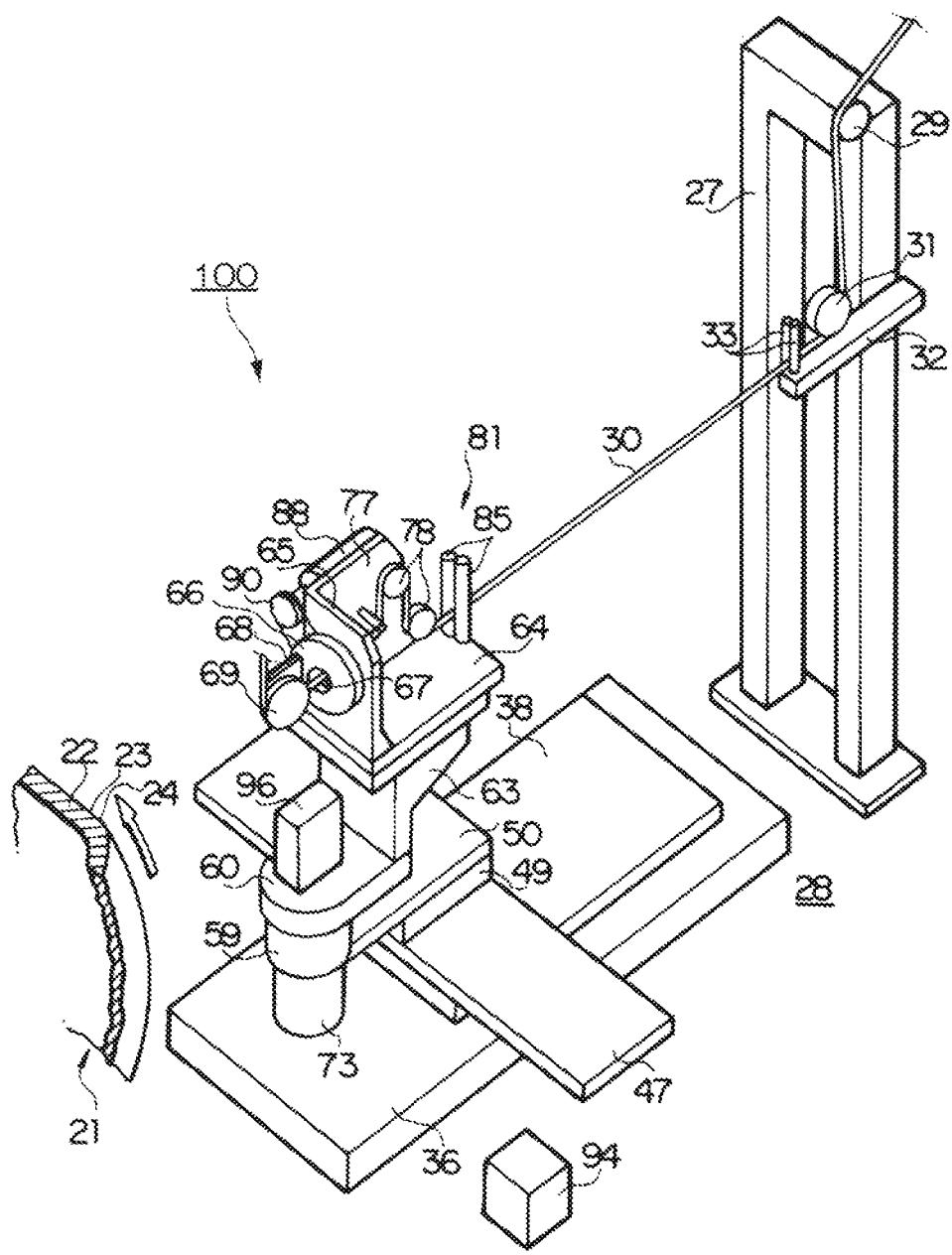
FIG. 1 is an overall schematic perspective view showing a strip-winding apparatus of an embodiment of the present invention.
Figure 2:
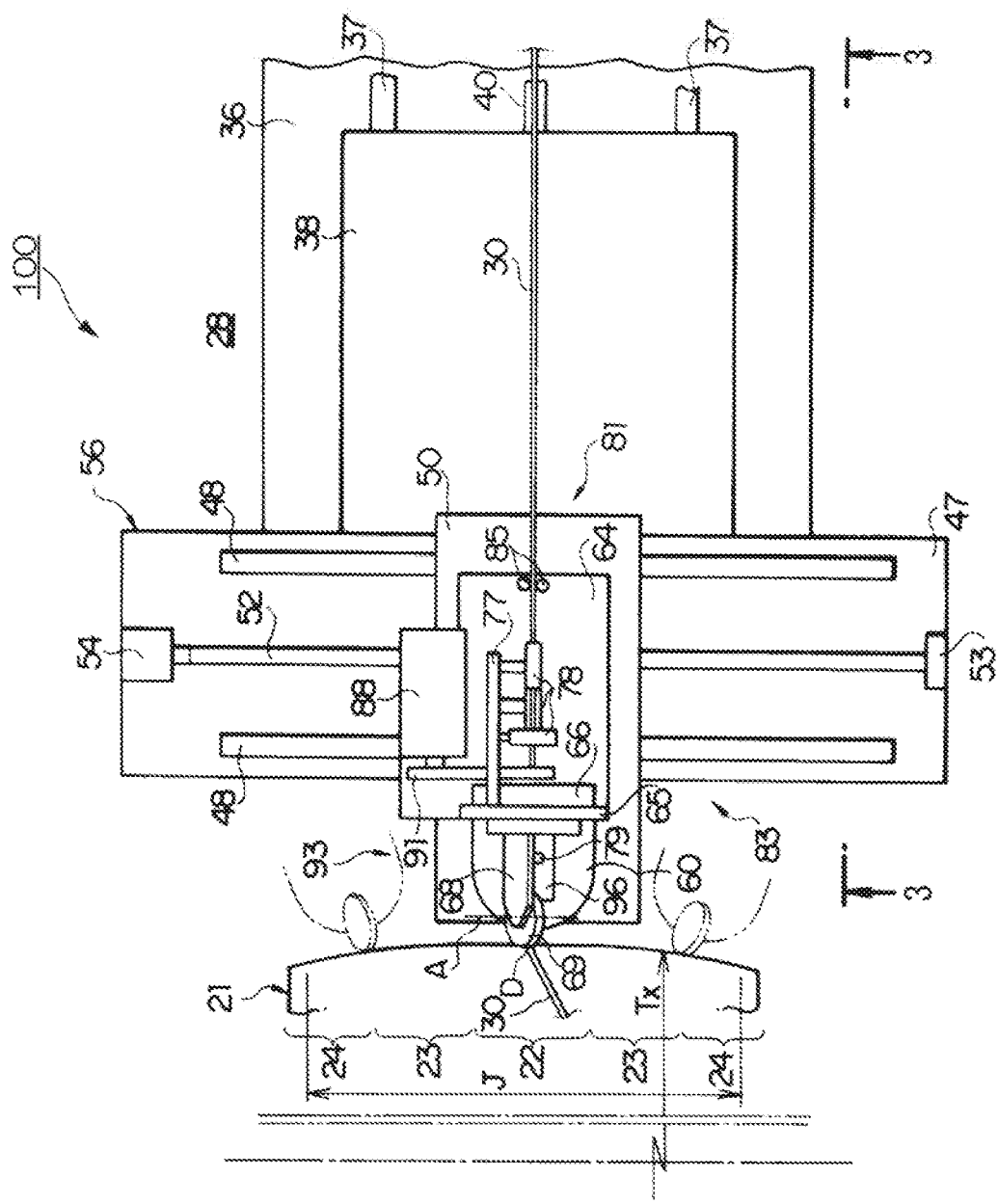
FIG. 2 is a plan view of the strip-winding apparatus.
Figure 3:
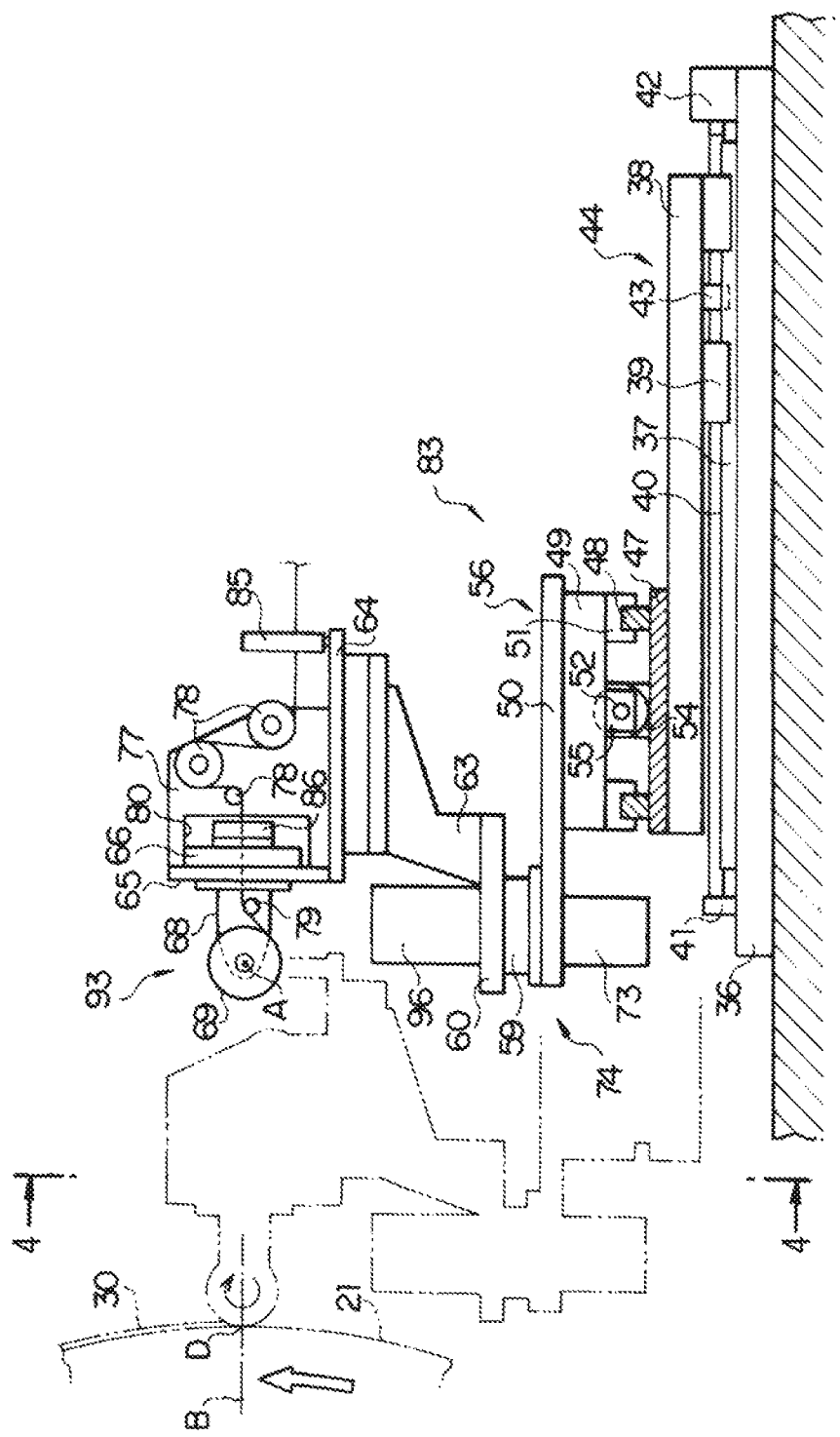
FIG. 3 is a cross-sectional view taken along 3-3 line in FIG. 2.
Figure 4:
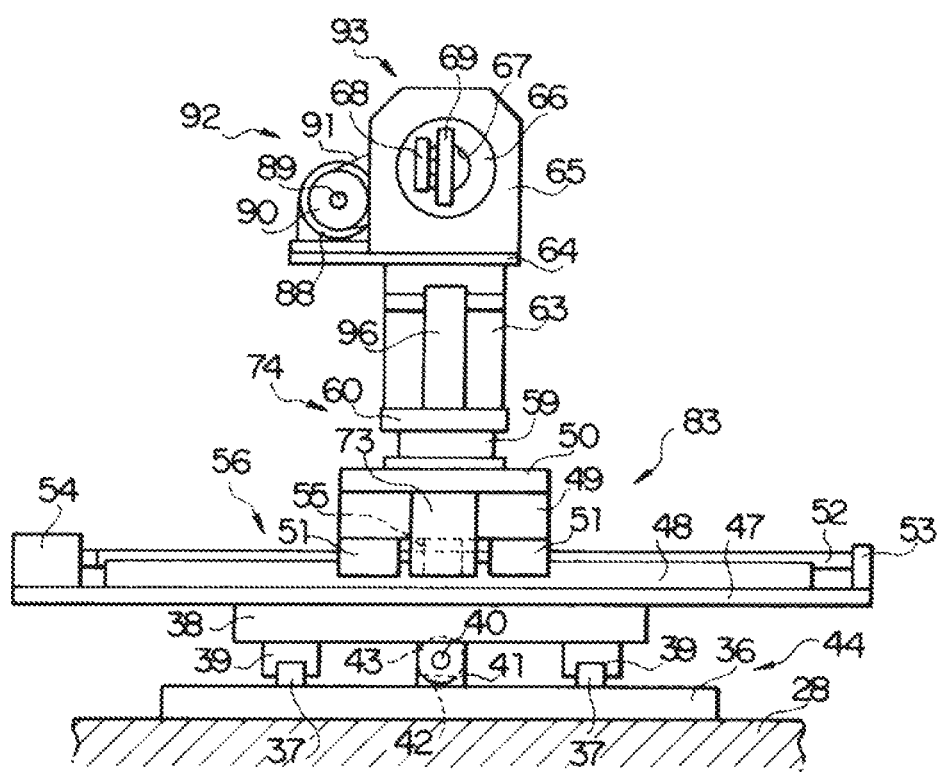
FIG. 4 is a view taken along 4-4 line m FIG. 3.
Figure 5:
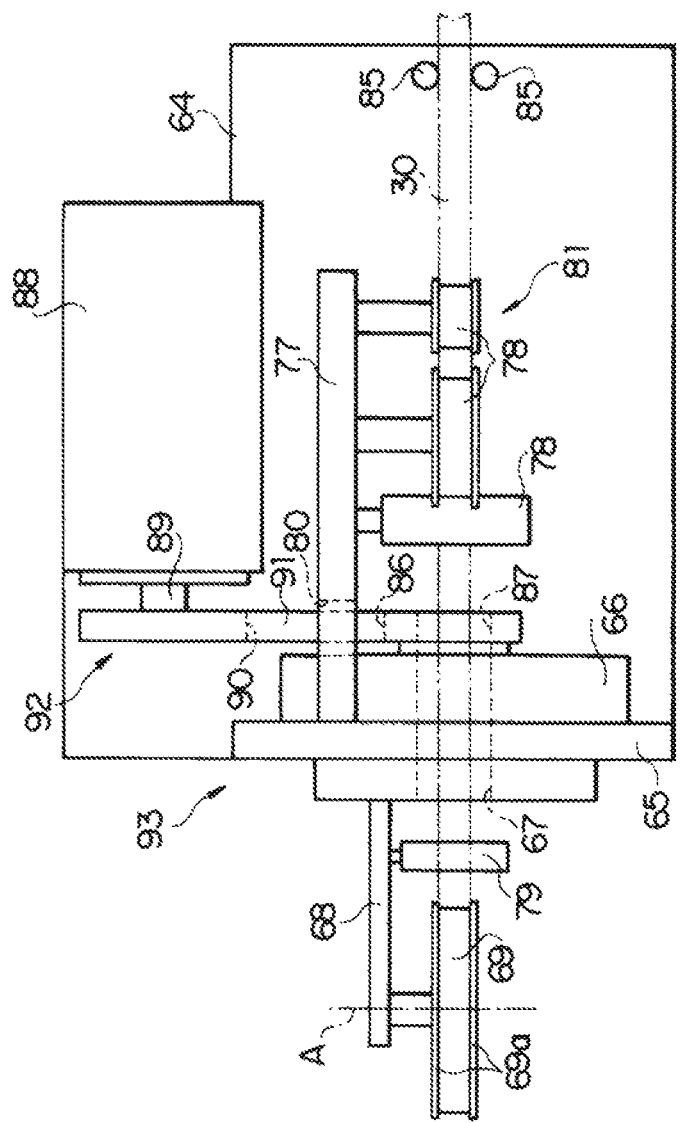
FIG. 5 is a plan view of an inclination angle-changing device and the vicinity thereof.
Figure 6:
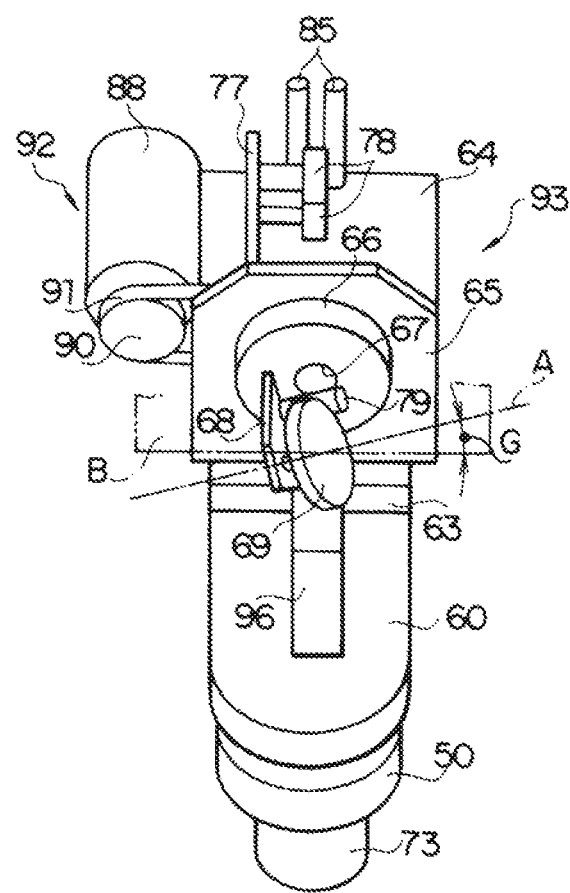
FIG. 6 is a perspective view of a winding roller and the vicinity thereof viewed from front of the winding roller.

Hereinafter, an embodiment of the present invention is described with reference to the drawings. FIG. 1 is an overall schematic perspective view showing a strip-winding apparatus 100 of an embodiment of the present invention. FIG. 2 is a plan view of the winding apparatus 100.

A winding apparatus 100 of this embodiment includes a supply device 81, a winding roller 69, a movement device 83, an inclination angle-changing device 93 and a controller 94 described later.

In FIGS. 1 and 2, the reference sign 21 represents a band-forming drum (a wound body) serving as a wound body which is rotatable on a horizontal axial line and in which the diameter of the drum is changeable. In FIG. 1, the drum 21 is shown using a partially cutaway view. A driving source (not shown) such as a driving motor adds a rotational driving force to the drum 21, and thereby the drum 21 can rotate on the axial line. The drum 21 includes a cylindrical constant diameter part 22 which is provided in the center in the axial direction of the drum 21 and has an outer diameter being constant irrespective of a position in the axial direction of the drum 21; a pair of first inclined parts 23 (inclined parts) which are provided on two sides in the axial direction of the constant diameter part 22 and in which the inner edges in the axial direction of the first inclined parts 23 are smoothly connected to the outer edges in the axial direction of the constant diameter part 22 and the axial direction cross-sectional outline (the outline of the outer circumferential surface in a cross-section of the first inclined pan 23 including the axial line thereof) of the first inclined part 23 is configured of an arc having a predetermined curvature radius; and a pair of second inclined parts 24 (inclined pans) which are provided on two outer sides in the axial direction of the first inclined parts 23 and in which the inner edges in the axial direction of the second inclined pans 24 are smoothly connected to the outer edges in the axial direction of the first inclined parts 23 and the axial direction cross-sectional outline of the second inclined part 24 is configured of an arc having a curvature radius less than that of the first inclined part 23. As a result, the constant diameter part 22 is a maximum diameter position (a position of the drum 21 having the maximum diameter) of the drum 21. In this way, the drum 21 is provided with inclined parts (in this embodiment, the first and second inclined parts 23 and 24) configured of a plurality of arcs (two arcs) whose curvature radius gradually decreases from the center toward outside in the axial direction of the drum 21. The diameters of the first and second inclined parts 23 and 24 gradually decrease from the maximum diameter part (the center in the axial direction) toward each of two outer sides of the drum 21.

In the present invention, the axial direction cross-sectional outline of the inclined part may be configured of an inclined straight line or of an arc having only a curvature radius. In the present invention, the axial direction cross-sectional outline of the outer circumferential surface of the wound body may be configured of an arc having only a comparatively lame curvature radius or may be configured of a plurality of arcs whose curvature radius gradually decreases toward outside in the axial direction of the wound body, and therefore the entire outer circumferential surface of the wound body may be configured as the inclined part. In this case, usually; the center in the axial direction of the wound body is the maximum diameter position. The maximum diameter position may be disposed at a position of the wound body different from the center thereof in the axial direction. In the present invention, a rigid core whose outer surface has the same shape as that of the inner surface of a vulcanized tire (a manufactured tire) or a tire intermediate which is formed around a forming drum and is configured of a carcass layer or the like bulging and deforming into an approximately arc shape in cross-section may be employed as the above-described wound body. In these cases, the entire outer circumferential surface of the wound body is the inclined part. In a case where the wound body is the tire intermediate, since it is difficult to obtain the cross-sectional outline shape of the tire intermediate beforehand, it is preferable that the shape of the cross-sectional outline be measured using a contactless photoelectric sensor, a laser sensor or the like before the winding of a strip is started.

In FIGS. 1 to 4, the reference sign 27 represents a gate-shaped support frame which is disposed on a floor 28 behind the drum 21 and extends in the up-and-down direction. In this embodiment, a direction in which the support frame 27 and the drum 21 are arranged in series is referred to as a "front-and-rear direction", and a side of the support frame 27 close to the drum 21 is referred to as a "front side". A guide roller 29 is rotatably supported by the upper end part of the support frame 27. A long strip 30 is unwound from an unwinding device (not shown) disposed behind the support frame 27 (on a side of the support frame 27 opposite to the drum 21) and is supplied to the guide roller 29. As the strip 30, it is possible to employ a narrow ribbon-shaped member in which a plurality (usually, several number such as 2 to 12) of arranged reinforcing cords extending in straight or in zigzag pattern and formed of nylon, aramid fiber, steel or the like are coated with unvulcanized rubber. In the present invention, a narrow ribbon-shaped member whose entirety is formed of unvulcanized rubber may be employed as the strip 30. A guide roller 31 is rotatably supported via a bracket 32 by the support frame 27 right under the guide roller 29, and changes the traveling direction of the strip 30 sent downward from the guide roller 29 into a direction toward front.

A pair of regulation rollers 33 are provided at the front end part of the bracket 32 positioned in front of the guide roller 31, and can rotate on vertical axial lines. These regulation rollers 33 are disposed to be separated the same distance as the width of the strip 30 from each other. After the traveling direction of the strip 30 has been changed into a direction toward front by the strip 30 turning around the guide roller 31, the strip 30 passes through a space between the regulation rollers 33 in the middle of traveling, and thereby two sides in the width direction of the strip 30 are brought into rolling contact with the regulation rollers 33. The reference sign 36 represents a horizontal rectangular plate-shaped base which is installed on the floor 28 between the dram 21 and the support frame 27 and extends in the front-and-rear direction. A pair of guide rails 37 are laid on the upper surface of the base 36 and extends parallel to a horizontal line perpendicular to the axial line of the drum 21 (namely, extends in the front-and-rear direction). The reference sign 38 represents a horizontal rectangular plate-shaped front-and-rear plate which is provided right above the base 36 and extends in the front-and-rear direction. A plurality of slide bearings 39 are fixed to the lower surface at the rear section of the front-and-rear plate 38 and are slidably engaged to the guide rails 37.

The reference sign 40 represents a screw shaft extending parallel to the guide rails 37 between the pair of guide rails 37. The front end of the screw shaft 40 is rotatably supported by a bracket 41 fixed to the front end part of the base 36, and the rear end of the screw shaft 40 is connected to the output shaft of a driving motor 42 attached to the rear end of the base 36. The male threaded portion of the screw shaft 40 is screwed into a screw block 43 fixed to the lower surface the front-and-rear plate 38. As a result, when the driving motor 42 operates and the screw shaft 40 rotates, the front-and-rear plate 38 moves in the front-and-rear direction while being guided by the guide rails 37. The guide rails 37, the front-and-rear plate 38, the slide bearings 39, the screw shaft 40, the driving motor 42 and the screw block 43 as a whole configure a second movement mechanism 44. The second movement mechanism 44 moves the winding roller described later in a direction perpendicular to the axial line of the drum 21 within one plane B (in this embodiment, a horizontal plane) including the axial line of the drum 21.

A center part in the longitudinal direction of a horizontal support plate 47 extending parallel, to the axial line of the drum 21 (namely, extending in the left-and-right direction) is fixed to the upper surface at the front end part of the front-and-rear plate 38, and a pair of guide rails 48 are laid on the upper surface of the support plate 47 and extend parallel to the axial line of the drum 21 (namely, extend in the left-and-right direction). In this embodiment, a side of the apparatus in which a bracket 53 described later is provided is referred to as a "left side" (refer to FIG. 2). A horizontal rectangular plate-shaped intermediate plate 49 is provided right above the guide rails 48, and a plurality of slide bearings 51 are fixed to the lower surface of the intermediate plate 49 and are slidably engaged to the guide rails 48. The reference sign 50 represents a horizontal rectangular plate-shaped left-and-right plate whose rear section is fixed to the upper surface of the intermediate plate 49 and which extends in the front-and-rear direction. The front section of the left-and-right plate 50 protrudes from the front end of the front-and-rear plate 38 toward front. The reference sign 52 represents a screw shaft extending parallel to the guide rails 48 between the pair of guide rails 48. The left end of the screw shaft 52 is rotatably supported by the bracket 53 fixed to the left end of the support plate 47, and the right end of the screw shaft 52 is connected to the output shaft of a driving motor 54 attached to the right end of the support plate 47.

The male threaded portion of the screw shaft 52 is screwed into a screw block 55 fixed to the lower surface of the intermediate plate 49. As a result, when the driving motor 54 operates and the screw shaft 52 rotates, the intermediate plate 49 and the left-and-right plate 50 move in the left-and-right direction while being guided by the guide rails 48. The support plate 47, the guide rails 48, the intermediate plate 49, the left-and-right plate 50, the slide bearings 51, the screw shaft 52, the driving motor 54 and the screw block 55 as a whole configure a first movement mechanism 56. The first movement mechanism 56 moves the winding roller described later in parallel to the axial line of the drum 21 within one plane B (in this embodiment, a horizontal plane) including the axial line of the drum 21. Although the second and first movement mechanisms 44 and 56 are configured to more the winding roller using a screw shaft, the present invention is not limited to this configuration. In the present invention, the winding roller may be moved using a linear motor, a cylinder or the like or using a structure in which these components and the above-described screw shaft are combined together.

In FIGS. 1 to 6, the front end part of the left-and-right plate 50 is provided with a wave gear-type first speed reducer 59 called harmonic drive (registered trademark). The first speed reducer 59 is configured of a cylindrical circular spline serving as a fixed side of the first speed reducer 59 which is fixed to the left-and-right plate 50 and includes an internal gear provided on the inner circumferential surface of the circular spline, a flex spline serving as an output side of the first speed reducer 59 which includes an external gear engaged to the internal gear of the circular spline and is resiliently deformable by the thickness of the flex spline being thin, and a wave generator serving as an input side of the first speed reducer 59 which is inserted into the flex spline and includes an ellipse-shaped cam whose axial line extends in the up-and-down direction (that is, the axial line is perpendicular to a horizontal plane). The reference sign 60 represents a pivot plate pivotably supported by the front end part of the left-and-right plate 50. The flex spline of the first speed reducer 59 is connected to the pivot plate 60.

The reference sign 63 represents an intermediate member whose lower end is fixed to the rear section of the pivot plate 60 and which inclines to extend diagonally rearward and upward from the rear section of the pivot plate 60. A horizontal support plate 64 is fixed to the upper end of the intermediate member 63. A rectangular plate-shaped vertical plate 65 is attached to the upper surface at the front end of the support plate 64 and extends in the up-and-down direction. A circular spline of a second speed reducer 66 to speed reducer) is fixed to the vertical plate 65. The second speed reducer 66 includes the circular spline, a flex spline and a wave generator similarly to the first speed reducer 59. In the present invention, an eccentric oscillation-type differential speed reducer may be employed instead of the wave gear-type first and second speed reducers 59 and 66. The wave generator of the second speed reducer 66 is provided with a through-hole 67 which penetrates the wave generator and is disposed at a position corresponding to the central axis of the second speed reducer 66, in detail, at a position corresponding to the axial line of the wave generator of the second speed reducer 66. The strip 30 in the middle of supply to the drum 21 can pass through the through-hole 67. That is, the second speed reducer 66 is provided in the middle of the supply path for the strip 30. The axial line of the wave generator of the second speed reducer 66 is positioned within the horizontal plane and extends in a direction perpendicular to the vertical plate 65.

The reference sign 68 represents a roller plate which is fixed to the front surface of the flex spline of the second speed reducer 66 and extends perpendicularly to the vertical plate 65. The winding roller 69 whose rotational axis line A is perpendicular to the axial line of the wave generator of the second speed reducer 66 is rotatably supported by an end part (the front end part) of the roller plate 68. Two edges in the axial direction of the winding roller 69 are provided with flanges 69a protruding from the outer circumferential surface of the winding roller 69, and the protrusion height of the flange 69a is the same as the thickness of the strip 30. If the strip 30 can be held, the protrusion height of the flange 69a may be less than the thickness of the strip 30. As a result, the winding roller 69 is supported via the roller plate 68 by the flex spline serving as the output said of the second speed reducer 66. The winding roller 69 can move alone the outer circumferential surface of the drum 21 within one plane B (a horizontal plane) including the axial line of the drum 21 by operation of the second and first movement mechanisms 44 and 56. In the present invention, the one plane 13 may be an inclination plane which inclines at an acute angle or an obtuse angle) with respect to a horizontal plane, or may be a vertical plane perpendicular to a horizontal plane. In the present invention, in order to simplify the position control of the winding roller 69, the front end (a winding start position D described later, a position of the winding roller 69 contacting the drum 21) of the winding roller 69 may be disposed at a position corresponding to the vertical axial line of the first speed reducer 59.

The reference sign 73 represents a driving motor fixed to the lower surface of the left-and-right plate 50 right under the first speed reducer 59. The output shaft of the driving motor 73 is connected to the wave generator of the first speed reducer 59. As a result, when the driving motor 73 operates and the flex spline of the first speed reducer 59 transmits decelerated rotation to the pivot plate 60, the pivot plate 60, the intermediate member 63, the support plate 64, the vertical plate 65 and the roller plate 68 together pivot, at a low speed around the vertical axial line (the axial line of the wave generator) of the first speed reducer 59. At this time, the winding roller 69 supported by the roller plate 68 pivots within a horizontal plane around the axial line of the wave generator of the first speed reducer 59, the axial line being perpendicular to the horizontal plane. The first speed reducer 59, the pivot plate 60, the intermediate member 63, the support plate 64, the vertical plate 65 and the roller plate 68 as a whole configure a pivot mechanism 74. The pivot mechanism 74 pivots the winding roller 69 around an axial line perpendicular to a horizontal plane.

At the time the winding roller 69 is moved by the second and first movement mechanisms 44 and 56 along the outer circumferential surface of the drum 21 within a horizontal plane in a state where the winding roller 69 is separated a constant distance from the outer circumferential surface of the drum 21, the winding roller 69 is pivoted by the pivot mechanism 74 around an axial line perpendicular to a horizontal line. Accordingly, even if the drum 21 is provided with the first and second inclined parts 23 and 24 as described above, it is possible to hold the rotational axis line A of the winding roller 69 to be parallel to a tangent line to the outer circumferential surfaces of the first and second inclined parts 23 and 24, the tangent line being within a horizontal plane. In the present invention, as the pivot mechanism, a worm-gear mechanism driven by a motor, or a rack-and-pinion mechanism or a link mechanism driven by a cylinder may be employed.

The reference sign 77 represents a rectangular plate-shaped guide plate which is fixed to the upper surface of the support plate 64 and extends in the up-and-down direction. The front end of the guide plate 77 is connected to the vertical plate 65, and the guide plate 77 extends perpendicularly to the vertical plate 65. A plurality (in this embodiment, three) of guide rollers 78 freely rotatable on horizontal axial lines are supported by the guide plate 77, and the strip 30 sent from the guide roller 31 is wound around these guide rollers 78 in order and thereby the traveling direction of the strip 30 is changed. At least one (in this embodiment, one) guide roller 79 freely rotatable on a horizontal axial line is supported by the roller plate 68, and guides toward the winding roller 69, the strip 30 supplied from the guide rollers 78. The front section of the guide plate 77 is provided with a rectangular through-window 80 penetrating the guide plate 77 in the left-and-right direction, and the right end part of the second speed reducer 66 protrudes rightward from the guide plate 77 through the through-window 80. The guide rollers 29, 31, 78 and 79 as a whole configure the supply device 81 which supplies the strip 30 to the drum 21. In the present invention, the specific configuration of the supply device is not limited to the above configuration, and for example, a conveyor may be employed, as the supply device, or a configuration in which guide rollers such as described above and a conveyor are combined together may be employed therefor.

Figure 8:
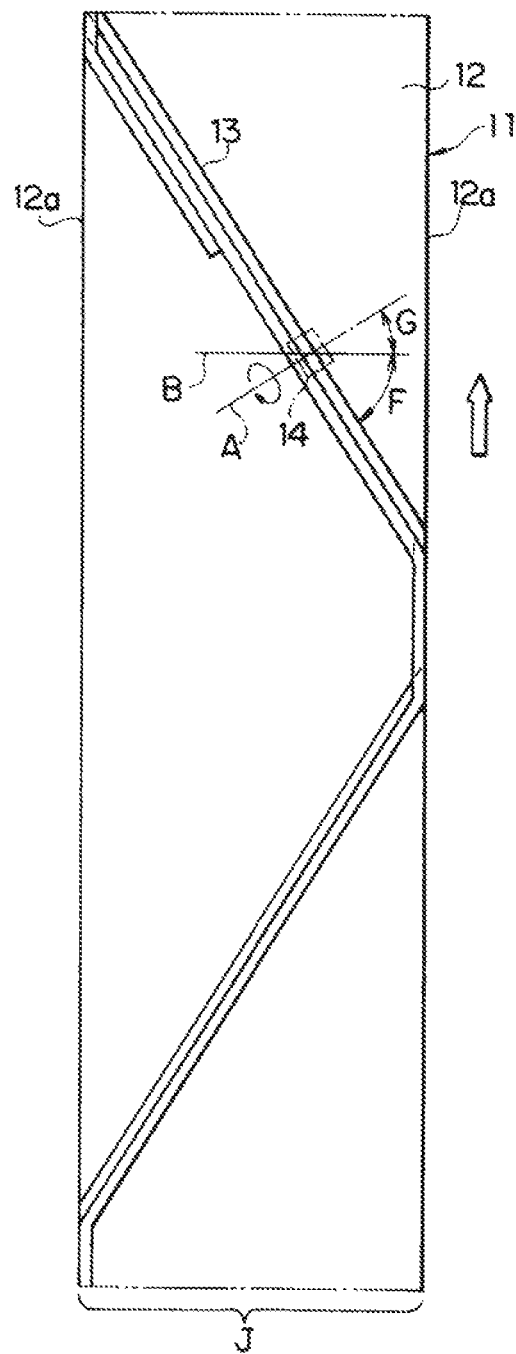
FIG. 8 is a development view showing a strip in the related art wound on an outer circumferential surface of a wound body.
Figure 9:
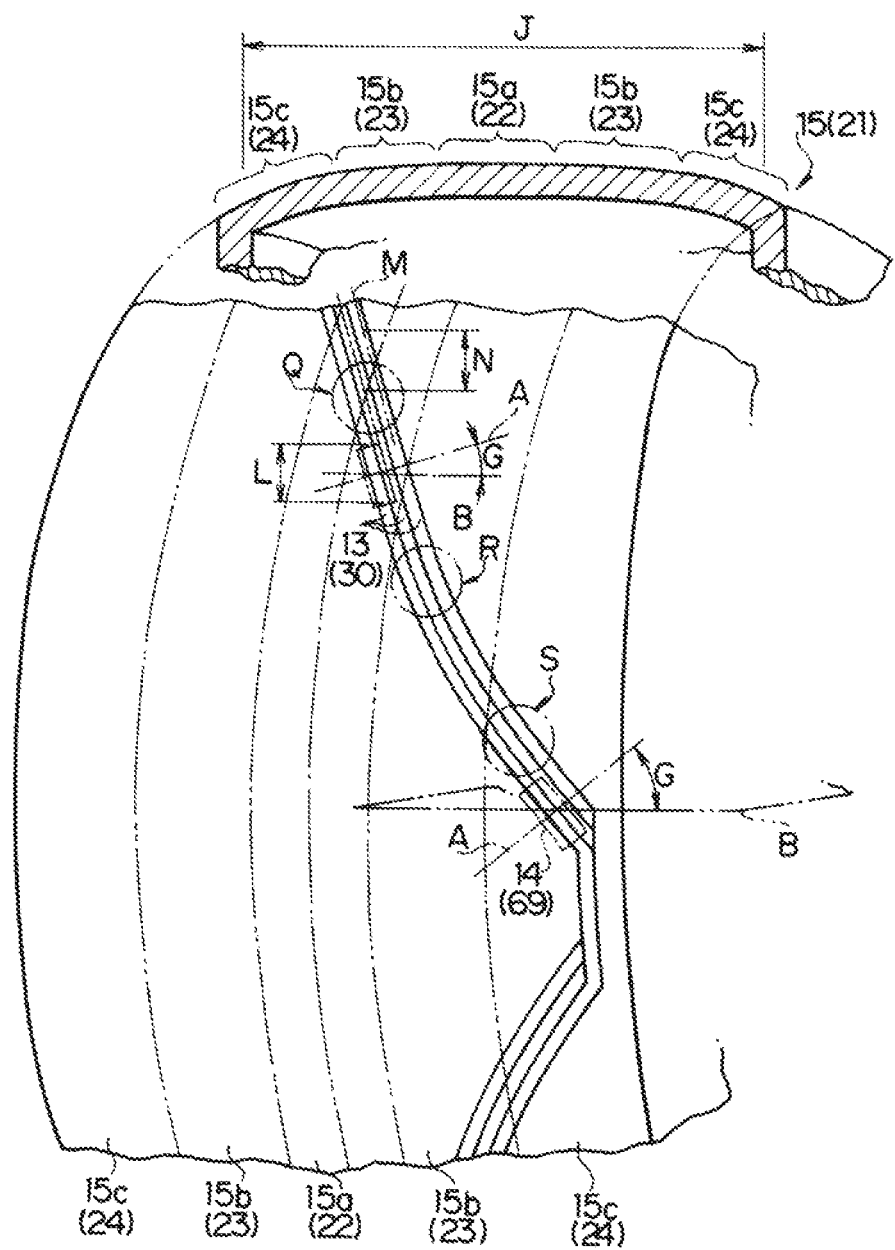
FIG. 9 is a partially cutaway perspective view showing a state where a strip is wound around a wound body including inclined parts.

At the time the drum 21 rotates on the axial line, when the supply device 81 supplies the strip 30 to the drum 21 while makes the strip 30 travel in the longitudinal direction thereof, the strip 30 is pressed on the outer circumferential surface of the drum 21 by the winding roller 69, in detail, by the outer circumferential surface of the winding roller 69 positioned between the flanges 69a, and thereby the strip 30 is wound on the outer circumferential surface of the drum 21. At this time, while the winding roller 69 is moved through operation of the second and first movement mechanisms 44 and 56 along the outer circumferential surface of the drum 21 within one plane B (a horizontal plane) in a state where the strip 30 is separated a constant distance (approximately the same distance as the thickness of the strip 30) from the outer circumferential surface of the drum 21, the support plate 64, the winding roller 69 and the like are pivoted by the pivot mechanism 74 around the vertical axial line of the first speed reducer 59, and therefore the rotational axis line A of the winding roller 69 is held parallel to a tangent line to the outer circumferential surface (particularly, the outer circumferential surfaces of the first and second inclined parts 23 and 24) of the drum 21, the tangent line crossing a horizontal plane (refer to FIG. 2). Accordingly, it is possible to easily wind the strip 30 in a helical pattern on the entire winding area 5 (refer to FIGS. 2, 8 and 9) of the outer circumferential surface of the drum 21 including the first and second inclined parts 23 and 24.

At this time, during winding of the strip 30 around the drum 21, a position at which the strip 30 starts being pressed on the drum 21 by the winding roller 69 is a winding start position D of the strip 30 on the drum 21. The winding start position D is a position at which the shortest straight line connecting the axial line of the drum 21 and the rotational axis line A of the winding roller 69 crosses the outer circumferential surface of the drum 21 and is disposed within the one plane B (a horizontal plane). The second and first movement mechanisms 44 and 56 and the pivot mechanism 74 as a whole configure the movement device 83. The movement device 83 moves the winding roller 69 along the outer circumferential surface of the drum 21 within the one plane B horizontal plane) so that the strip 30 is wound on the outer circumferential surface of the drum 21 in a helical pattern. When the movement device 83 is configured of the first movement mechanism 56 which moves the winding roller 69 in parallel to the axial line of the drum 21 within a horizontal plane serving as one plane B, the second movement mechanism 44 which moves the winding roller 69 perpendicularly to the axial line of the drum 21 within the horizontal plane, and the pivot mechanism 74 which pivots the winding roller 69 around an axial line perpendicular to the horizontal plane as shown in this embodiment, it is possible to reliably wind the strip 30 on the outer circumferential surface of the drum 21 in a helical pattern while a simple configuration is adopted.

In the present invention, as the movement device, a device may be employed which is configured of a guide cam or guide slit positioned within one plane B and extending along the outer circumferential surface of a wound body and of a movement mechanism configured to move a support body supporting a winding roller along the guide cam or guide slit, or an articulated industrial robot may be employed in which a winding roller is supported by the end of a hand of the robot. The reference sign 85 represents a pair of rotatable regulation rollers provided in the rear end part of the support plate 64. These regulation rollers 85 are rotatable on vertical axial lines and are disposed to be separated the same distance as the width of the strip 30 from each other. That is the same separation as the width of the strip 30 is formed between the pair of regulation rollers 85. The regulation rollers 85 are provided facing the regulation rollers 33. The strip 30 passes through a space between the regulation rollers 85 in the middle of supply thereof by the supply device 81 to the drum 21, and at this time, two sides in the width direction of the strip 30 are in rolling contact with the regulation rollers 85.

When the winding roller 69 is moved by the movement device 83 along the outer circumferential surface of the drum 21 within a horizontal plane as described above, the relative position (distance and angle) between the guide roller 31 serving as the exit of the stationary side of the apparatus and the guide roller 78 serving as the entrance of the moving side thereof greatly changes, and the length of the strip 30 with which these rollers are bridged and the inclination angle thereof with respect to a line extending in the front-and-rear direction greatly change in accordance with the passage of time. However, as described above, two pairs of regulation rollers 33 and 85 separated from each other in a direction parallel to the supply path for the strip 30 are provided in the middle of the supply path for the strip 30 toward the drum 21, and two sides in the width direction of the strip 30 in the middle of supply are in rolling contact with the two pairs of regulation rollers 33 and 85. Therefore, even when the length of the strip 30 between the guide rollers 31 and 78 and the inclination angle thereof with respect to a line extending in the front-and-rear direction change, since the regulation rollers 33 and 85 regulate the strip 30 in the width direction thereof, this structure can absorb such a change. Thus, it is possible to supply the strip 30 to the drum 21 in a stable attitude. In addition, in the two pairs of regulation rollers 33 and 85, at least one pair of regulation rollers need to be provided.

The reference sign 86 represents a timing pulley which is connected to the wave generator of the second speed reducer 66 and is coaxial with this wave generator. A position of the timing pulley 86 corresponding to the axial line thereof is provided with a through-hole 87 coaxial with the through-hole 67 provided in the second speed reducer 66. The strip 30 in the middle of supply passes through the through-hole 87. The reference sign 88 represents a driving motor attached to the support plate 64 in the right area of the guide plate 77. A timing pulley 90 fixed to an output shaft 89 of the driving motor 88 and the timing pulley #6 are bridged with a timing belt 91, and the timing belt 91 passes through the through-window 80. The timing pulley 86, the driving motor 88, the timing pulley 90 and the timing belt 91 as a whole configure a driving mechanism 92 which adds a rotational driving force to the second speed reducer 66. The second speed reducer 66 and the driving mechanism 92 as a whole configure the inclination angle-changing device 93. The inclination angle-changing device 93 adds a rotational driving force to the winding roller 69 and rotates the winding roller 69 on a normal line to the outer circumferential surface of the drum 21, the normal line being positioned within one plane B (a horizontal plane) and being at the winding start position D, and thereby can change the inclination angle (namely, the roller inclination angle G (refer to FIGS. 6 and 9)) of the rotational axis line A of the winding roller 69 with respect to the one plane B (a horizontal plane). In this way, the rotational axis line A of the winding roller 69 can incline with respect to one plane B (a horizontal plane) including the axial line of the drum 21. That is, the inclination angle-changing device 93 can change the roller inclination angle G.

As described above, when the inclination angle-changing device 93 is configured of the second speed reducer 66 which is provided in the middle of the supply path for the strip 30 and which is provided with the through-hole 67 through which the strip 30 in the middle of supply passes and of the driving mechanism 92 which adds a rotational driving force to the second speed reducer 66, and the winding roller 69 is supported by the output side of the second speed reducer 66, the strip 30 in the middle of supply to the drum 21 does not have to detour around the inclination angle-changing device. Therefore, the supply path for the strip 30 can be set to a simple shape, and can be easily shortened. In the present invention, as the inclination angle-changing device, a hydraulic or electric rotary actuator, a servomotor or the like can also be employed. The inclination angle-changing device of the present invention may be configured of a structure (a link or the like) which changes as linear driving force of a linear moving actuator (a cylinder or the like) into a rotational driving force. The reference sign 94 represents a controller (refer to FIG. 1) such as a personal computer. The controller 94 outputs control signals to the driving source which drives and rotates the drum 21 and to the driving motors 42, 54, 73 and 88, and controls the operation (on/off, the rotational speed and the like) of the driving source and the driving motors 42, 54, 73 and 88.

When the controller 94 controls the operation of the driving motor 88 and a rotational driving force of the driving motor 68 is input to the wave generator of the second speed reducer 66, a low-speed rotation is transmitted from the second speed reducer 66 to the winding roller 69. Accordingly, the winding roller 69 rotates on a normal line to the outer circumferential surface of the drum 21, the normal line being positioned within a horizontal plane (one plane B) and being at the winding start position D and the rotational axis line A of the winding roller 69 inclines at a predetermined angle with respect to the horizontal plane. At the time the strip 30 is wound on the outer circumferential surface of the drum 21 in a helical pattern as described above, the wound strip 30 inclines with respect to a horizontal plane (refer to FIGS. 7A to 7B and 9). The controller 94 controls the inclination angle-changing device 93 (the driving motor 88), and thereby the inclination angle (the roller inclination angle G) of the winding roller 69 is changed so that the inclination angle F of the rolling direction (the extending direction of the width direction centerline M of the strip 30) of the winding roller 69 with respect to a horizontal plane becomes a predetermined constant angle at the constant diameter part 22 and becomes an angle at the first and second inclined parts 23 and 24 slightly less than that at the constant diameter part 22 as described below. Therefore, the strip 30 is smoothly and appropriately wound on the outer circumferential surface of the drum 21.

When the strip 30 in an inclined state reaches one of two ends in the width direction of the winding area J while being wound in helical pattern as described above, as shown in FIG. 9, the strip 30 is wound a constant length on the outer circumferential surface of the drum 21 in the circumferential direction of the drum 21. In this case, the controller 94 controls the operation of the driving motor 88, and thereby the inclination angle of the winding roller 69 is changed so that the crossing angle between the rotational axis line A of the winding roller 69 and a horizontal plane becomes zero. In this way, while sections in which the strip 30 extends in the circumferential direction are provided in two ends in the width direction of the winding area J, the strip 30 is wound on the outer circumferential surface of the drum 21 in a zigzag pattern so that a wave having approximately two cycles is formed in every round of the drum 21. In the present invention, the number of cycles of the wave in one round of the drum 21 is not limited, and for example, the strip 30 may be wound so that a wave having approximately one cycle is formed in every round of the drum 21.

As described above, the drum 21 includes the first and second inclined parts 23 and 24 whose diameter gradually decreases from the center (the maximum diameter position) in the axial direction of the drum 21 serving as the maximum outer diameter portion thereof to each of two outer sides in the axial direction of the drum 21. If the strip 30 is wound on the outer circumferential surface (the outer circumferential surface other than two ends in the axial direction of the drum 21) of the first and second inclined parts 23 and 24 in a state where the roller inclination angle G is held to be constant, while the circumferential direction length L of the strip 30 is approximately constant at any position in the axial direction as described above, the outer diameter and circumferential length of the first and second inclined parts 23 and 24 gradually decreases from the maximum diameter position (the constant diameter part 22) toward outside in the axial direction of the drum 21. Therefore, in the first and second inclined parts 23 and 24, two edges in the width direction of portions next to each other of the strip 30 overlap each other, and thus the gap between the portions of the strip 30 may disappear or may significantly decrease. In this embodiment, although the strip 30 at a winding time is wound on the new side (the rear side in the rotational direction of the dram 21) of the strip 30 wound at the previous time to the winding time, in the present invention, the strip 30 at a winding time may be wound on the old side (the front side in the rotational direction of the drum 21) of the strip 30 wound at the previous time to the winding time.

Since the above-described circumferential direction length L of the strip 30 is the length of the strip 30 of a unit length measured in the circumferential direction of the drum 21, when the roller inclination angle G increases, the circumferential direction length L decreases.

In order to manage disappearance of the gap or a significant decrease of the width thereof, in this embodiment, the controller 94 controls the operation of the driving motor 88 of the inclination angle-changing device 93 so that the winding roller 69 is rotated on the above-described normal line to the first and second inclined parts 23 and 24 (the normal line is with respect to the outer circumferential surface of the first and second inclined parts 23 and 24 and is a straight line which passes through the winding start position D and is positioned within a horizontal plane), and the roller inclination angle G of the winding roller 69 at the time the strip 30 is wound around the first and second inclined parts 23 and 24 is set to be greater than that at the time the strip 30 is wound around the maximum diameter position (the constant diameter part 22) of the drum 21. As a result, the extending direction of the rotational axis line A of the winding roller 69 at the first and second inclined parts 23 and 24 is more similar to the circumferential direction than that at the constant diameter part 22 (the maximum diameter position), and thereby the rolling direction of the winding roller 69 inclines in accordance with the inclination of the width direction centerline M. Thus, as shown in FIGS. 7A, 7B and 7C, the circumferential direction lengths L1 and L2 of the strip 30 at the first and second inclined parts 23 and 24, respectively, are less than the circumferential direction length $L_0$ of the strip 30 at the constant diameter part 22 (the maximum diameter position).

As described above, since the circumferential length of the drum 21 at the first and second inclined parts 23 and 24 is less than that at the constant diameter part 22 (the maximum diameter position), the circumferential direction distance N between the width direction centerlines M of portions next to each other of the strip 30 wound around the drum 21 at the first and second inclined parts 23 and 24 is less than that at the constant diameter part 22. However, in this embodiment, as described above, the circumferential direction length L of the strip 30 at the first and second inclined, parts 23 and 24 becomes less than that at the constant diameter part 22 (the maximum diameter position). Therefore, the value of the circumferential direction length L of the strip 30 wound around the first and second inclined parts 23 and 24 becomes close to the value of the circumferential direction distance N between the width direction centerlines M of portions next to each other of the strip 30 wound around the first and second inclined parts 23 and 24. As a result, the value of the gap 95 (the value thereof in the width direction of the strip 30) between portions next to each other of the strip 30 wound around the first and second inclined parts 23 and 24 becomes close to the value of the gap 95 between portions next to each other of the strip 30 wound around the constant diameter part 22 (the maximum diameter position). In FIGS. 7A to 7B, 8 and 9, in order to facilitate understanding, the inclination angle F (90°-G) between the width direction centerline M of the strip 30 at the first and second inclined parts 23 and 24 and one plane B is shown to be greater than an actual inclination angle.

On the other hand, the circumferential length of the first and second inclined parts 23 and 24 gradually decreases toward an outer side in the axial direction of the drum 21 as described above, and thereby the circumferential direction distance N between the width direction centerlines M of portions next to each other of the strip 30 also gradually decreases similarly to above. Therefore, the controller 94 controls the inclination angle-changing device 93 so that the roller inclination angle G of the winding roller 69, at the time the strip 30 is wound around the first and second inclined parts 23 and 24, gradually increases from the constant diameter part 22 the maximum diameter position) to a distant position therefrom of the drum 21, and the circumferential direction length L of the wound strip 30 gradually decreases toward an outer side in the axial direction of the drum 21. In this way, the relationship between the circumferential direction distance N and the circumferential direction length L at the first inclined part 23 can be set to be similar to that at the second inclined part 24, and thereby the value of the gap 95 between portions next to each other of the strip 30 at the entire area of the first and second inclined parts 23 and 24 can be easily brought close to the value of the gap 95 therebetween at the constant diameter part 22 (the maximum diameter position).

Figure 7A:
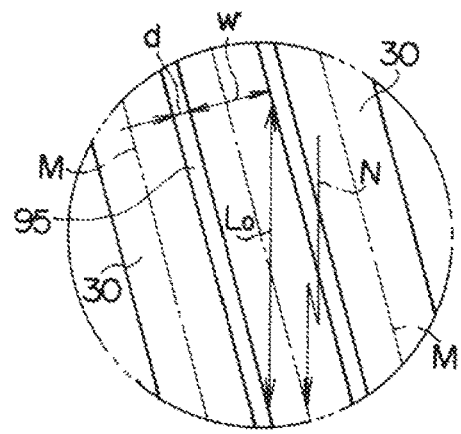
FIG. 7A is an enlarged view of an area Q in FIG. 9 of the embodiment of the present invention.
Figure 7B:
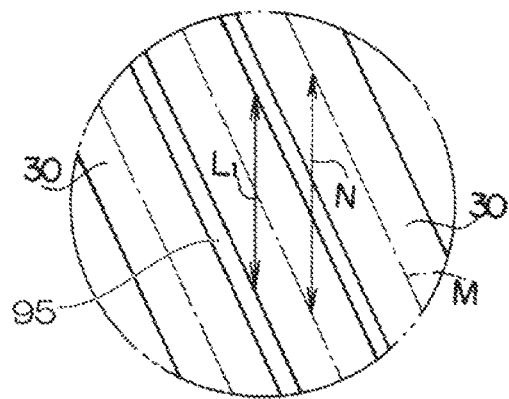
FIG. 7B is an enlarged view of an area R in FIG. 9 of the embodiment of the present invention.
Figure 7C:
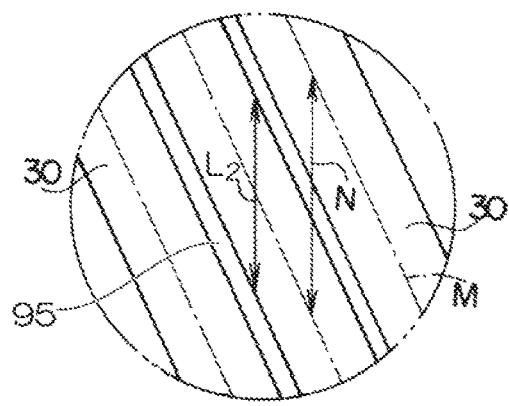
FIG. 7C is an enlarged view of an area S in FIG. 9 of the embodiment of the present invention.

In this embodiment, when the diameter of the drum 21 at a position on the first inclined part 23 or the second inclined part 24 is represented by a sign Tx, the number of winding the strip 30 in a state where the strip 30 is wound on the entire circumference (one round) of the drum 21 is represented by a sign n, the width of the strip 30 as shown in FIG. 7A is represented by a sign w, and the value of the gap 95 in a width direction of the strip 30 between portions next to each other of the strip 30 wound around the drum 21 is represented by a sign d, the controller 94 controls the inclination angle-changing device 93 in order to set the roller inclination angle Gx of the winding roller 69, at the time the strip 30 is wound on the position on the first inclined part 23 or the second inclined part 24, to a value shown by the following Equation (1).

$$Gx=\sin^{-1}\{n \times (w+d)/(\pi \times Tx)\} \qquad \text{Equation (1)}$$

In this way, at any position on the first and second inclined parts 23 and 24, the circumferential direction distance N between the width direction centerlines M of portions next to each other of the strip 30 can be matched to a length obtained by adding the circumferential direction length L of the strip 30 and the circumferential direction length of the gap 95 together. Accordingly, the value of the gap 95 between portions next to each other of the strip 30 can be a constant value (be constant) at any position on the constant diameter part 22 (the maximum diameter position) and the first and second inclined parts 23 and 24.

In this embodiment, the controller 94 controls the inclination angle-changing device 93, thereby continuously changing the roller inclination angle G of the winding roller 69 into a value shown by the Equation (1) at the time the strip 30 is wound around the first and second inclined parts 23 and 24. However, in the present invention, the roller inclination angle G may be changed only one time while the strip 30 is wound around the first and second inclined parts 23 and 24, for example, only one time at the boundary between the first and second inclined parts 23 and 24, or may be discontinuously changed a plurality of times during winding described above, for example, may be changed at each time the strip 30 is wound the distance corresponding to the width w of the strip 30 on the first and second inclined parts 23 and 24. The reference sign 96 represents a detector fixed to the movement device 83, in detail, to the upper surface of the front section of the pivot plate 60. The detector 96 can detect the circumferential direction distance between portions next to each other of strip 30 wound on the outer circumferential surface of the drum 21, for example, the circumferential direction length of the gap 95 positioned between portions next to each other of strip 30, or the circumferential direction distance N between the width direction centerlines M of portions next to each other of strip 30. When the detector 96 is provided in the movement device 83 in this way, it is possible to always watch a winding condition of the strip 30, and if an unfavorable condition occurs such as disappearance of the gap 95 or a significant decrease of the width thereof it is possible to quickly manage it.

Next, the operation of this embodiment is described.

When the strip 30 is wound on the entire winding area J in the outer circumferential surface of the drum 21 including the first and second inclined parts 23 and 24. First, while the drum 21 is rotated on the axial line thereof by the driving source, the strip 30 unwound from the unwinding device is made to travel in the longitudinal direction thereof while contacting the guide rollers 29, 31, 78 and 79 of the supply device 81 in order, and is supplied to the outer circumferential surface of the winding roller 69 from the lower side of the winding roller 69 (a first step). At this time, while the controller 94 operates the second and first movement mechanisms 44 and 56, thereby moving the winding roller 69 along the outer circumferential surface of the drum 21 within one plane 13 (a horizontal plane) in a state where the winding roller 69 is separated a constant distance (approximately the same distance as the thickness of the strip 30) from the outer circumferential surface of the drum 2.1, the controller 94 operates the pivot mechanism 74, the winding roller 69 is pivoted around the axial line of the first speed reducer 59, and thereby the rotational axis line A of the winding roller 69 is moved to be parallel to the outer circumferential surface of the drum 21 within a horizontal plane, for example, to be parallel to a tangent line to the outer circumferential surface of the first and second inclined parts 23 and 24. At this time, the strip 30 supplied to the drum 21 through the winding roller 69 is pressed by the winding roller 69 on the outer circumferential surface of the drum 21 at the winding start position D, and thereby the strip 30 is wound around the circumference (the winding area J) of the drum 21 in a helical pattern (a second step).

At the time the strip 30 is wound around the drum 21, for example, on the outer circumferential surface of the constant diameter part 22 in a helical pattern, the wound strip 30 inclines with respect to a horizontal plane. During winding of the strip 30 around the constant diameter part 22, the controller 94 controls the driving motor 88, thereby rotating the winding roller 69 on a normal line to the outer circumferential surface of the drum 21, the normal line passing through the winding start position D, and thus the roller inclination angle G of the rotational axis line A of the winding roller 69 with respect to a horizontal plane is adjusted to a constant angle. That is, the crossing angle (the inclination angle F) between the rolling direction (the winding direction of the strip 30) of the winding roller 69 and a horizontal plane is adjusted to a constant angle. Next, the winding of the strip 30 around the constant diameter part 22 at a constant angle is finished, and winding of the strip 30 is started at the first inclined part 23 whose diameter gradually decreases toward outside in the axial direction of the drum 21. At this time, the controller 94 controls the operation of the driving motor 88 of the inclination angle-changing device 93, whereby the winding roller 69 is rotated (usually, a small angle of 1° or less) on a normal line to the outer circumferential surface of the first inclined part 23, the normal line passing through the winding start position D, and the roller inclination angle G of the winding roller 69 at the time the strip 30 is wound around the first inclined part 23 is set to be greater than that at the time the strip 30 is wound around the maximum diameter position (the constant diameter part 22) of the drum 21.

As shown in FIGS. 7A and 7B, although the value of the circumferential direction distance N between the width direction centerlines M of portions next to each other of the strip 30 wound around the first inclined part 23 is less than that at the constant diameter part 22 (the maximum diameter position), when the above-described control is performed, the circumferential direction length L of the strip 30 at the first inclined part 23 can be less than that at the constant diameter part 22 (the maximum diameter position). As a result, the value of the circumferential direction length L of the strip 30 wound around the first inclined part 23 becomes close to the value of the circumferential direction distance N between the width direction centerlines M of portions next to each other of strip 30 wound around the first inclined part 23, and thereby the value of the gap 95 between portions next to each other of strip 30 wound around the first and second inclined parts 23 and 24 becomes close to the value of the gap 95 between portions next to each other of strip 30 wound around the constant diameter part 22 (the maximum diameter position). Subsequently, the strip 30 is wound around the second inclined part 24, and when a control similar to the above-described control is performed at this time, the value of the circumferential direction length L of the strip 30 becomes close to the value of the circumferential direction distance N between the width direction centerlines M of portions next to each other of strip 30, and thus the value of the gap 95 at the second inclined part 24 can also be brought close to the value of the gap 95 at the constant diameter part 22 in the same way. At this time, when the roller inclination angle G is set to a value shown by the Equation (1), the value of the gap 95 between portions next to each other of strip 30 can be a constant value be constant) at any position within the constant diameter part 22 (the maximum diameter position) and the first and second inclined parts 23 and 24 of the drum 21.

When winding of the strip 30 reaches one end (positioned in the second inclined part 24) in the width direction of the winding area J, the controller 94 controls the inclination angle-changing device 93 (the driving motor 88), and thereby the winding roller 69 is inclined in a short time up to a state where the crossing angle between the rotational axis line A of the winding roller 69 and a horizontal plane becomes zero. When the winding roller 69 reaches one end in the width direction of the winding area J, the operation of the movement device 83 (the driving motors 42, 54 and 73) is temporarily stopped. In this state, the drum 12 continues rotating a predetermined angle without being stopped, and the strip 30 is wound a predetermined distance in the circumferential direction on one end in the width direction of the winding area J. In this way, the strip 30 wound in helical pattern and the strip 30 wound in the circumferential direction can be connected to each other via an arc having a comparatively short curvature radius, and therefore it is possible to continuously wind the strip 30 without stopping rotation of the drum 21 and to easily improve the operating efficiency.

Next, the controller 94 operates the inclination angle-changing device 93 (the driving motor 88), whereby the winding roller 69 is rotated on a normal line to the outer circumferential surface of the second inclined part 24, the normal line passing through the winding start position D, and is inclined up to a state where the roller inclination angle G becomes the same angle as described above, and the movement device 83 (the driving motors 42, 54 and 73) is operated. As a result, the strip 30 wound in the circumferential direction and the strip 30 wound in helical pattern are connected to each other via an arc having a comparatively short curvature radius. Thereafter, after the strip 30 is wound similarly to the above manner around the second inclined pan 24 and the first inclined part 23 in order in a helical pattern which are disposed on one end in the width direction of the winding area J, the strip 30 is wound around the constant diameter part 22, and thereafter is wound around the first inclined part 23 and the second inclined part 24 in order which are disposed on the other end in the width direction of the winding area J. In this way, the strip 30 is wound in helical pattern from one end to the other end in the width direction of the winding area J, and at this time, the controller 94 also controls the inclination angle-changing device 93, and thereby the value of the circumferential direction length L of the strip 30 becomes close to the value of the circumferential direction distance N between the width direction centerlines M of portions next to each other of strip 30. At this time, the winding direction of the strip 30 with respect to the circumferential direction of the drum 21 is opposite to the winding direction described above. That is, the inclination directions of the strip 30 at this time and the previous time are symmetrical with respect to a line extending the circumferential direction.

In this way, the strip 30 is wound on the outer circumferential surface of the drum 21, in detail, on the entire winding area J, continuously in the circumferential direction in a zigzag pattern while the strip 30 is turned back from each of two ends in the width direction of the winding area J, and at this time, the strip 30 is bent while forming a wave shape having approximately two cycles in every round of the drum 21. The winding as described above is repeated a predetermined times (the above-described n times), and two plies, in which portions of the strip 30 overlapping each other in a up-and-down direction (the radial direction of the drum 21) incline in directions opposite to each other, are formed at one process. The winding in this way is further repeated, and a plurality of plies may be formed whose number is a multiple (an integral multiple) of two. A ply formed in this way can be used for a belt layer, a belt-reinforcing layer or the like of a tire used for an aircraft, automobile, truck or bus. When an approximately cylindrical ply is formed around the drum 21 in this way, a tread is attached to the outer surface of the ply, and thus a belt-tread band is formed. Next, after the diameter of the drum 21 is reduced, the formed belt-tread band is detached from the drum 21 and is carried to the next process by a conveying apparatus (not shown). In a case where the wound body is a tire intermediate as described above, a belt layer or the like may be formed directly on the outer circumferential surface of the tire intermediate similarly to the above manner.

In the above embodiment, although the strip 30 is wound in zigzag pattern while the strip 30 is turned back from each of two ends in the width direction of the winding area J, in the present invention, a strip may be wound on the outer circumferential surface of a wound body in helical pattern while the strip is inclined at a small angle with respect to a line extending in the circumferential direction. In the present invention, when the winding direction of the strip 30 is changed into the circumferential direction from a state where the winding direction inclines at an inclination angle F with respect to a horizontal plane, or when the winding direction thereof is changed from a state where the strip 30 is wound in the circumferential direction into a state where the winding direction inclines at an inclination angle F with respect to a horizontal plane, the rotation of the drum 21 may be temporarily stopped, the winding direction of the strip 30 may be changed, and thereafter the drum 21 may be rotated again from a state of being stopped. In the present invention, at the time the strip 30 is wound around the constant diameter part 22, the winding roller 69 may be inclined using a cylinder, a link mechanism or the like so that the roller inclination angle G becomes a predetermined constant angle, and at the time the strip 30 is wound around the first and second inclined parts 23 and 24, the roller inclination angle G may be finely adjusted by the inclination angle-changing device 93.

In the above embodiment, the roller inclination angle G at the time the strip 30 is wound around the drum 21 is changed between the constant diameter part 22, the first inclined part 23 and the second inclined part 24. Therefore, as described above, the length (the circumferential direction length L) of the strip 30 of a unit length measured in the circumferential direction of the drum 21 decreases in the order of the constant diameter part 22, the first inclined part 23 and the second inclined part 24. In contrast, the length of the strip 30 of the above unit length measured in the width direction of the drum 21 increases in the order of the constant diameter part 22, the first inclined part 23 and the second inclined part 24. Accordingly, in a state where the drum 21 rotates at a constant speed, the speed at which the winding roller 69 is moved within one plane B may be changed between the constant diameter part 22, the first inclined part 23 and the second inclined part 24. In this case, the operation of the movement device 83 (the second and first movement mechanisms 44 and 56 and the pivot mechanism 74) based on control of the controller 94 is appropriately adjusted between the constant diameter part 22, the first inclined part 23 and the second inclined part 24. For example, it is conceivable that the movement speed of the winding roller 69 by the first movement mechanism 56 is increased, in the order of the constant diameter part 22, the first inclined part 23 and the second inclined part 24.

INDUSTRIAL APPLICABILITY

The present invention can be applied to a strip-winding method and a strip-winding apparatus for winding a strip on the outer circumferential surface of a wound body in helical pattern.

DESCRIPTION OF REFERENCE SIGNS 21 drum (wound body)
22 constant diameter part (maximum diameter position)
23 first inclined part (inclined part)
24 second inclined part (inclined part)
30 strip
33, 85 regulation roller
44 second movement mechanism
56 first movement mechanism
66 speed reducer
67 through-hole
69 winding roller
74 pivot mechanism
81 supply device
83 movement device
92 driving mechanism
93 inclination angle-changing device
94 controller
96 detector
100 winding apparatus
A rotational axis line
B one plane
G roller inclination angle

The invention claimed is:

1. A strip-winding apparatus, comprising:
a supply device which supplies a strip to a wound body including an inclined part whose diameter gradually decreases toward outside in an axial direction of the wound body, the wound body being rotatable on an axial line;
a rotatable winding roller in which a rotational axis line thereof is capable of inclining with respect to one plane including the axial line of the wound body, the winding roller being capable of pressing the strip supplied to the wound body on the wound body;
a movement device which moves the winding roller along an outer circumferential surface of the wound body within the one plane so that the strip is wound on the outer circumferential surface of the wound body in a helical pattern;
an inclination angle-changing device which is capable of changing a roller inclination angle of the rotational axis line of the winding roller with respect to the one plane; and
a controller which controls the inclination angle-changing device and is configured to set the roller inclination angle at the time the strip is wound around the inclined part to be greater than the roller inclination angle at the time the strip is wound around a maximum diameter position of the wound body,
wherein the inclination angle-changing device includes:
a speed reducer disposed in the middle of a supply path for the strip and provided with a through-hole through which the strip in the middle of supply passes; and
a driving mechanism which adds a rotational driving force to the speed reducer; and
wherein the winding roller is supported by an output side of the speed reducer.

2. The strip-winding apparatus, according to claim 1, wherein the controller is configured to gradually increase the roller inclination angle of the winding roller from the maximum diameter position of the wound body toward a distant position therefrom at the time the strip is wound around the inclined part.

3. The strip-winding apparatus, according to claim 2, wherein the diameter of the wound body at a position on the inclined part is represented by a sign Tx, the number of winding the strip in a state where the strip is wound on the entire circumference of the wound body is represented by a sign n, the width of the strip is represented by a sign w, the gap in a width direction of the strip between portions next to each other of the strip wound around the wound body is represented by a sign d, and the controller is configured to set to a value shown by the following Equation (1), the roller inclination angle Gx at the time the strip is wound on the position on the inclined part.

$$Gx = \sin^{-1}\{n \times (w+d)/(\pi \times Tx)\} \quad \text{Equation (1)}$$

4. The strip-winding apparatus, according to claim 1, wherein the movement device includes a detector which detects a circumferential direction distance between portions next to each other of the strip wound around the wound body.

5. The strip-winding apparatus, according to claim 1, wherein at least a pair of regulation rollers are disposed in the middle of a supply path for the strip, and two sides in a width direction of the strip in the middle of supply are in rolling contact with the regulation rollers.

6. The strip-winding apparatus, according to claim 1, wherein the movement device includes:
   a first movement mechanism which moves the winding roller in parallel to the axial line of the wound body within a horizontal plane serving as the one plane;
   a second movement mechanism which moves the winding roller perpendicularly to the axial line of the wound body within the horizontal plane; and
   a pivot mechanism which pivots the winding roller around an axial line perpendicular to the horizontal plane.

7. The strip-winding apparatus, according to claim 1, wherein the winding roller is rotatably supported by a roller plate fixed to the output side of the speed reducer, and
wherein the inclination angle-changing device is configured to change the roller inclination angle of the rotational axis line of the winding roller with respect to the one plane by rotating the roller plate.

8. The strip-winding apparatus, according to claim 1, wherein the speed reducer is fixed to a plate configured to allow the strip in the middle of supply to pass therethrough, and
wherein the speed reducer is configured to allow the output side thereof to rotate with respect to the plate.

9. The strip-winding apparatus, according to claim 1, wherein the speed reducer is a wave gear-type speed reducer.

10. The strip-winding apparatus, according to claim 1, wherein the speed reducer is an eccentric oscillation-type differential speed reducer.

* * * * *